United States Patent [19]
Bastio

[11] Patent Number: 5,503,601
[45] Date of Patent: Apr. 2, 1996

[54] AUTOMATIC TRANSMISSION PERFORMANCE IMPROVEMENT KIT

[76] Inventor: Michael J. Bastio, 1092 S. Reservoir, Pomona, Calif. 91766

[21] Appl. No.: 941,535

[22] Filed: Sep. 8, 1992

Related U.S. Application Data

[63] Continuation-in-part of Ser. No. 837,494, Feb. 18, 1992, abandoned.

[51] Int. Cl.⁶ .................................................. F16H 61/00
[52] U.S. Cl. ............................................................ 475/116
[58] Field of Search ............................................. 475/116

[56] References Cited

U.S. PATENT DOCUMENTS

| | | | |
|---|---|---|---|
| 2,711,656 | 6/1955 | Smirl | 74/868 X |
| 3,543,610 | 12/1970 | Kogaki | 74/867 |
| 3,753,377 | 8/1973 | General | 74/856 |
| 4,126,024 | 11/1978 | Timmons et al. | 70/233 |
| 4,210,034 | 7/1980 | Younger | 74/606 R |
| 4,226,200 | 10/1980 | Moresawa et al. | 74/606 R |
| 4,350,058 | 9/1982 | Miller et al. | 74/866 |
| 4,404,822 | 9/1983 | Green | 70/233 |
| 4,449,426 | 5/1984 | Younger | 74/606 R X |
| 4,506,563 | 5/1985 | Hiramatsu | 74/868 X |
| 4,878,045 | 10/1989 | Tanaka et al. | 340/556 |
| 4,924,731 | 5/1990 | Hayakawa et al. | 74/869 |
| 4,970,882 | 11/1990 | Arrendondo | 70/30 |
| 4,971,345 | 11/1990 | Braun et al. | 280/288.4 |
| 5,027,676 | 7/1991 | Fujiwara et al. | 74/869 |
| 5,050,459 | 9/1991 | Ishikawa et al. | 74/869 X |
| 5,086,665 | 2/1992 | Milunas et al. | 74/867 X |

FOREIGN PATENT DOCUMENTS

| | | | |
|---|---|---|---|
| 350018 | 1/1990 | European Pat. Off. | 74/640 |

*Primary Examiner*—Dirk Wright
*Attorney, Agent, or Firm*—Robert T. Spaulding

[57] ABSTRACT

An automatic transmission performance improvement kit comprising a set of components, which upon installation into an automatic transmission will allow the torque convertor clutch to lock up only in fourth gear. Shift lag is eliminated and clutches and bands will no longer slip. All of the components contained in the kit are or were previously used in automatic transmissions supplied by the same vendor as the subject transmission.

2 Claims, 6 Drawing Sheets

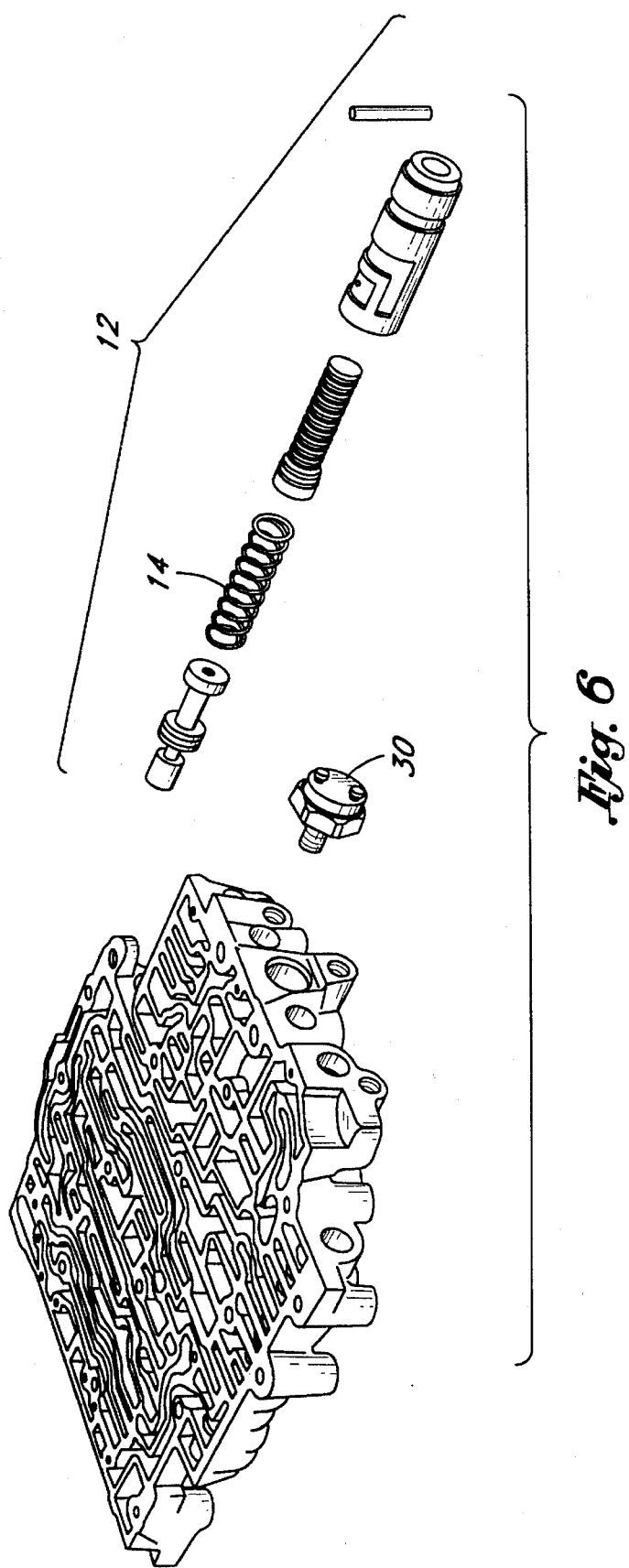

AUTOMATIC TRANSMISSION PERFORMANCE IMPROVEMENT KIT

This application is a continuation-in-part of application Ser. No. 07/837,494 dated Feb. 18, 1992 now abandoned.

BACKGROUND OF THE INVENTION

1) Field of the Invention

This invention relates generally to automatic transmissions and more specifically to the General Motors Inc. type 700R4 automatic transmission.

2) Description of the Prior Art

The GM 700R4 automatic transmission is a well built four speed automatic transmission that is equipped with a lock-up converter. Under normal driving conditions, as the transmission cycles from gear to gear, slippage, that is, the total time required to apply a band or clutch has been optimized to effect a soft shift feel that is generally well accepted by the driving public. The transmission is capable of withstanding the torque and horsepower of all past and present models of GM cars and trucks. In some cases, however, GM's vehicles are modified for uses such as heavy towing, off road racing, dragsters, and track racing.

Corvette and Camero are registered trademarks of the General Motors Corporation.

As a service to this market, GM provides many components intended to improve the performance of their cars and trucks. Using these components, the power output of the engine can be enhanced, suspension and handling improved, and the gears in the differential may be optimized for the particular end use of the vehicle. Under these harsh conditions, the durability of the 700R4 transmission may become questionable. GM does not provide a component list for improving the performance or ruggedness of the transmission.

Modifications to improve the performance of the GM 700R4 automatic transmission is a well established art. For example, in the kits commercially offered by B&M Automotive Products, Art Carr Performance Transmission Products, and Mr. Shift® from Research Co. However, all of the currently available performance improvement kits contain proprietary components which augment or replace original General Motors components.

Accordingly, one object and advantage of this invention is to provide a performance improvement kit which utilizes only General Motors components.

Another object and advantage of this invention is that the modified transmission is more durable and will last longer than an unmodified transmission.

Further objects and advantages of this invention will become apparent from a consideration of the drawings and ensuing description of it.

SUMMARY OF THE INVENTION

The present invention comprises a series of alterations and modifications to the General Motors, Inc. (GM) type 700R4 automatic transmission. Installation of the performance improvement kit requires a partial dismantling of the transmission: the oil pan, valve body and spacer plate must first be removed. In each instance where a component of the transmission is removed and replaced with a component furnished with the kit, the replacement is also a GM part. Hence the finalized transmission is composed entirely of GM components.

To reduce slippage during the transition from third to fourth gear, instructions included with the performance improvement kit suggest that the accumulator spring located adjacent to the piston within the valve body be removed. To reduce slippage during the transition between first and second gear, the remaining accumulator spring may be removed. An additional piston, GM part number 8648998, is assembled in conjunction with the original piston. The new piston assembly is then replaced within the valve body. This modification greatly reduces slippage in second and fourth gear.

Another alteration requires the removal of the servo cushion spring from the servo assembly, thereby reducing slippage during the transition from second gear to third gear. In order to increase the main oil pressure, and thereby increase the total holding pressure on the bands and clutches within the transmission, the existing transmission pressure regulator spring is removed and replaced with the pressure regulator spring, GM part number 8642494, listed as a standard part for transmissions supplied with the Chevrolet division of GM model 1986 Corvette™ and law enforcement vehicles. If the transmission is to be used in a high performance vehicle, a performance kit is available that additionally replaces the second band apply piston and piston housing with the piston, GM part number 8642079 and housing, GM part number 8642110, normally supplied with Corvette™ transmissions. The second band apply piston replacement is smaller in diameter, and with the same amount of oil and pressure, the replacement piston will move quicker and decrease apply time. Included in the instructions for the installation of the kit for high performance vehicles is the removal of a check ball, GM part number 8654097, which equalizes the oil pressure at the detent valve, thereby eliminating downshift from fourth gear to third gear at zero percent throttle position.

To improve the shift point, delay the up-shift, and increase down-shift capabilities, the valve body spring is removed and replaced with the valve body spring listed as a standard part for the transmission supplied with the Chevrolet division of GM model 1986 Camero™ equipped with the 350 CID engine. No part number is available for this spring.

The fourth gear pressure switch, which controls torque converter clutch apply and release and is operated by signals from the engine's computer, is removed. This switch is replaced in the fourth gear passage with a third gear pressure switch, GM part number 8643710, listed as a standard part for the transmission supplied with GM vehicles equipped with diesel engines. The replacement switch is rewired to a twelve volt source and internally grounded for constant operation. In this modification, the computer is removed from the loop, the torque converter clutch is applied in fourth gear only and stays applied. Fourth gear oil pressure closes the switch.

BRIEF DESCRIPTION OF THE DRAWINGS

FIG. 6 shows an exploded view of the valve body spring.

DESCRIPTION OF THE PREFERRED EMBODIMENT

Figure 1:
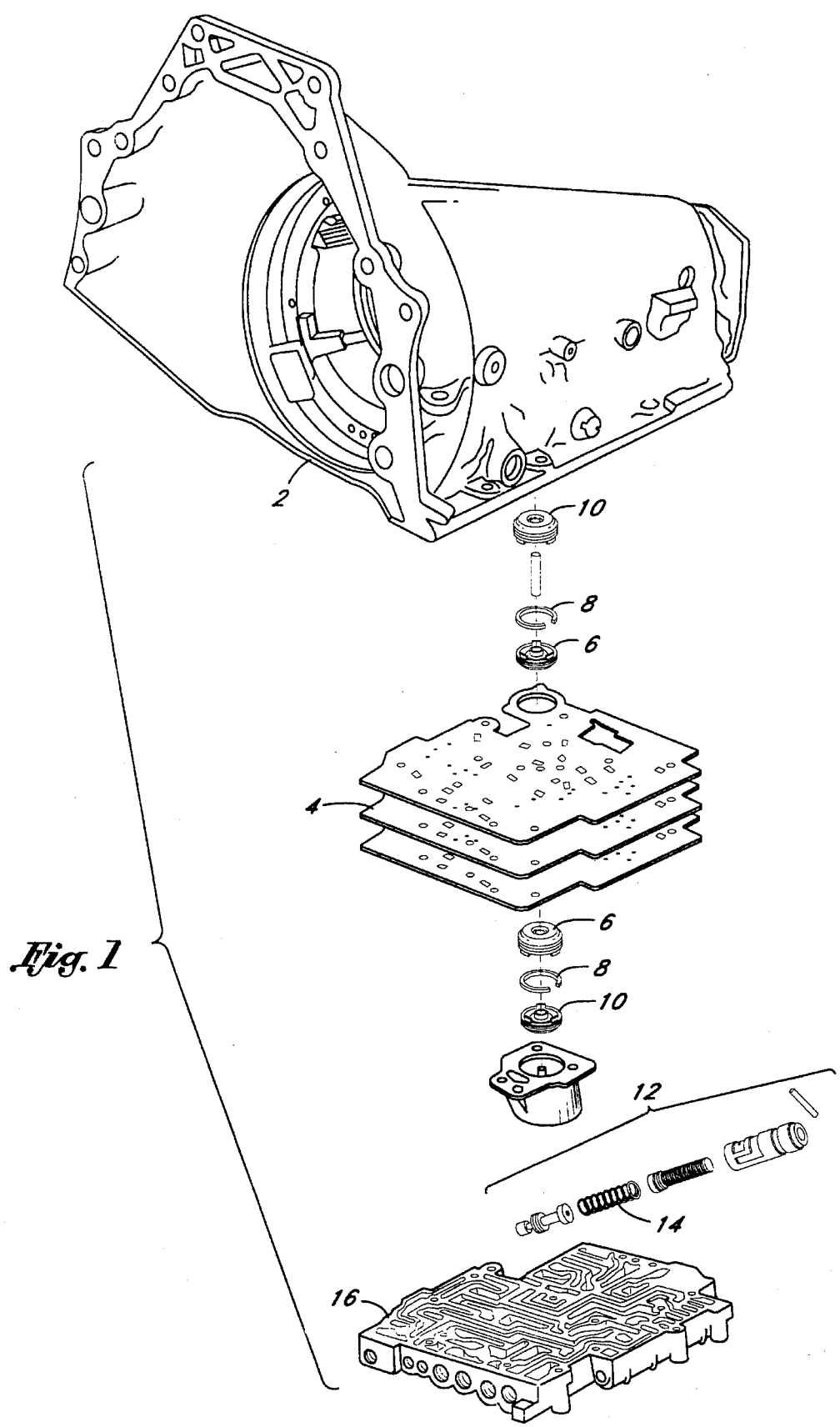
FIG. 1 shows an exploded view of the type 700R4 automatic transmission.
Figure 2:
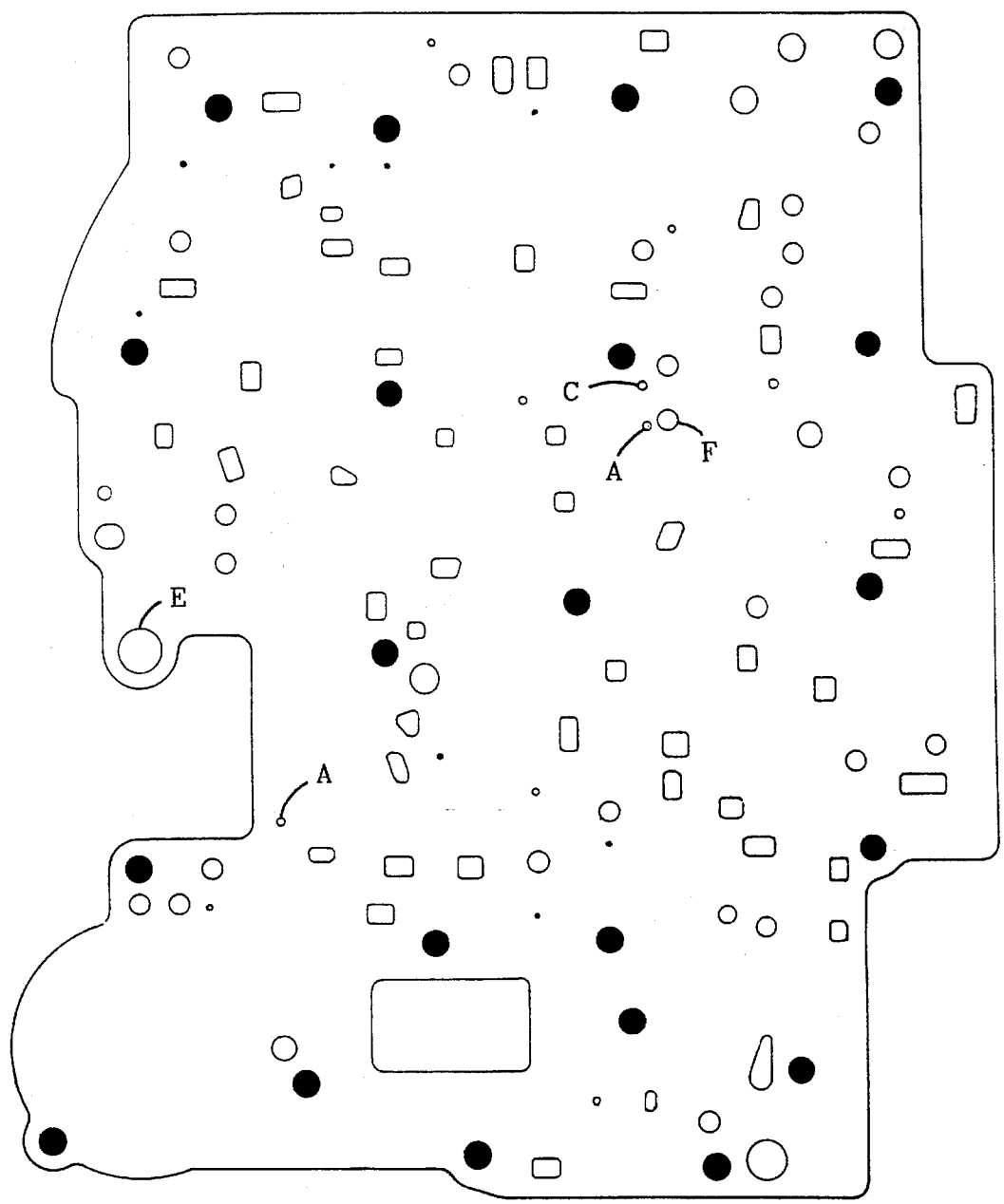
FIGS. 2 and 3 show spacer plates.
Figure 3:
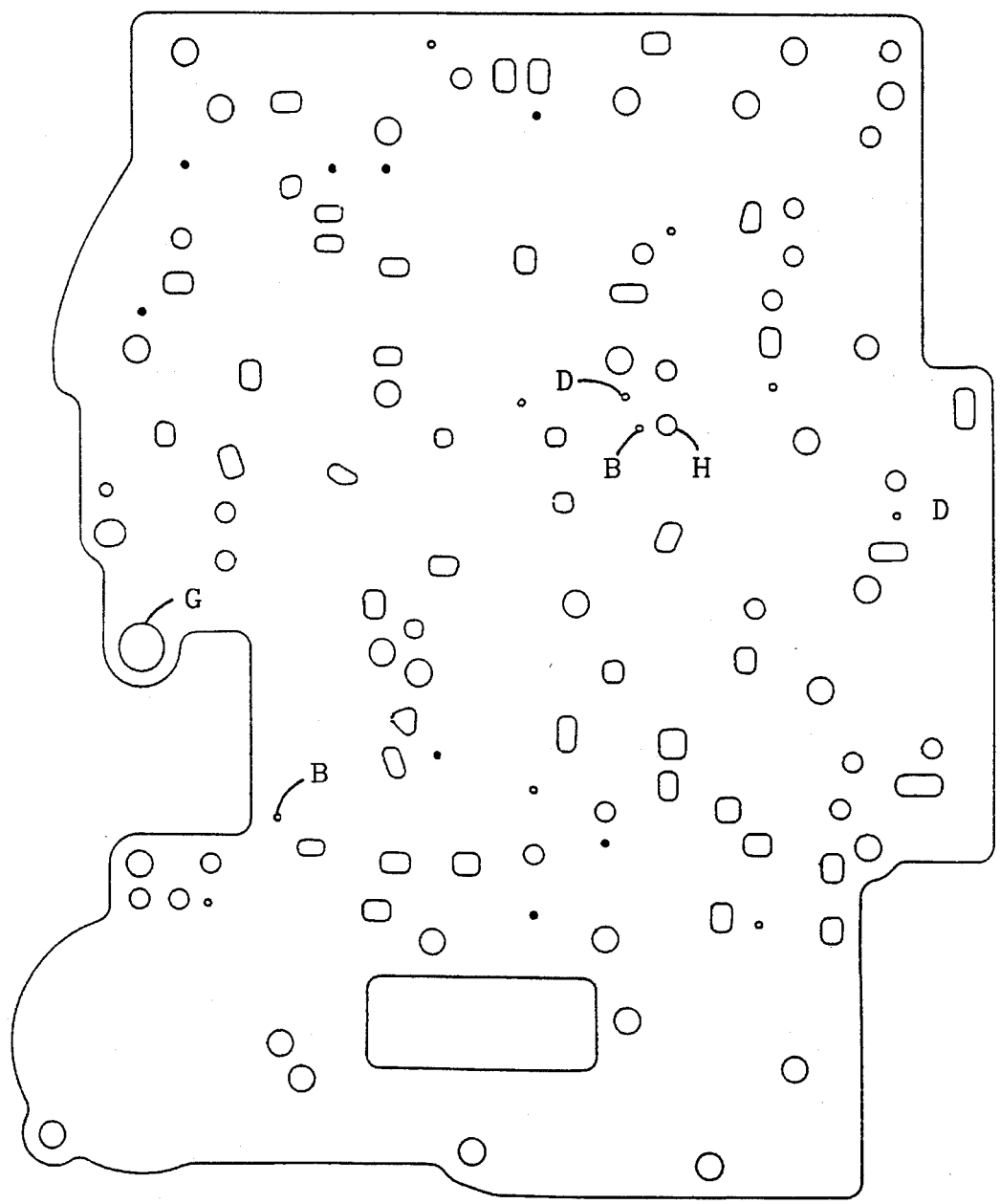

FIG. 1 shows an exploded view of the automatic transmission 2 with the spacer plate 4, new piston 6, which is a component of the performance improvement kit, the seal for the original piston 8, and the original piston 10 shown in conjunction. The spring adjacent to the original piston 10 has been removed and replaced with the new piston 6, which is installed upside down. The new piston and the old piston are mated by interlocking their respective dogs.

Figure 4:
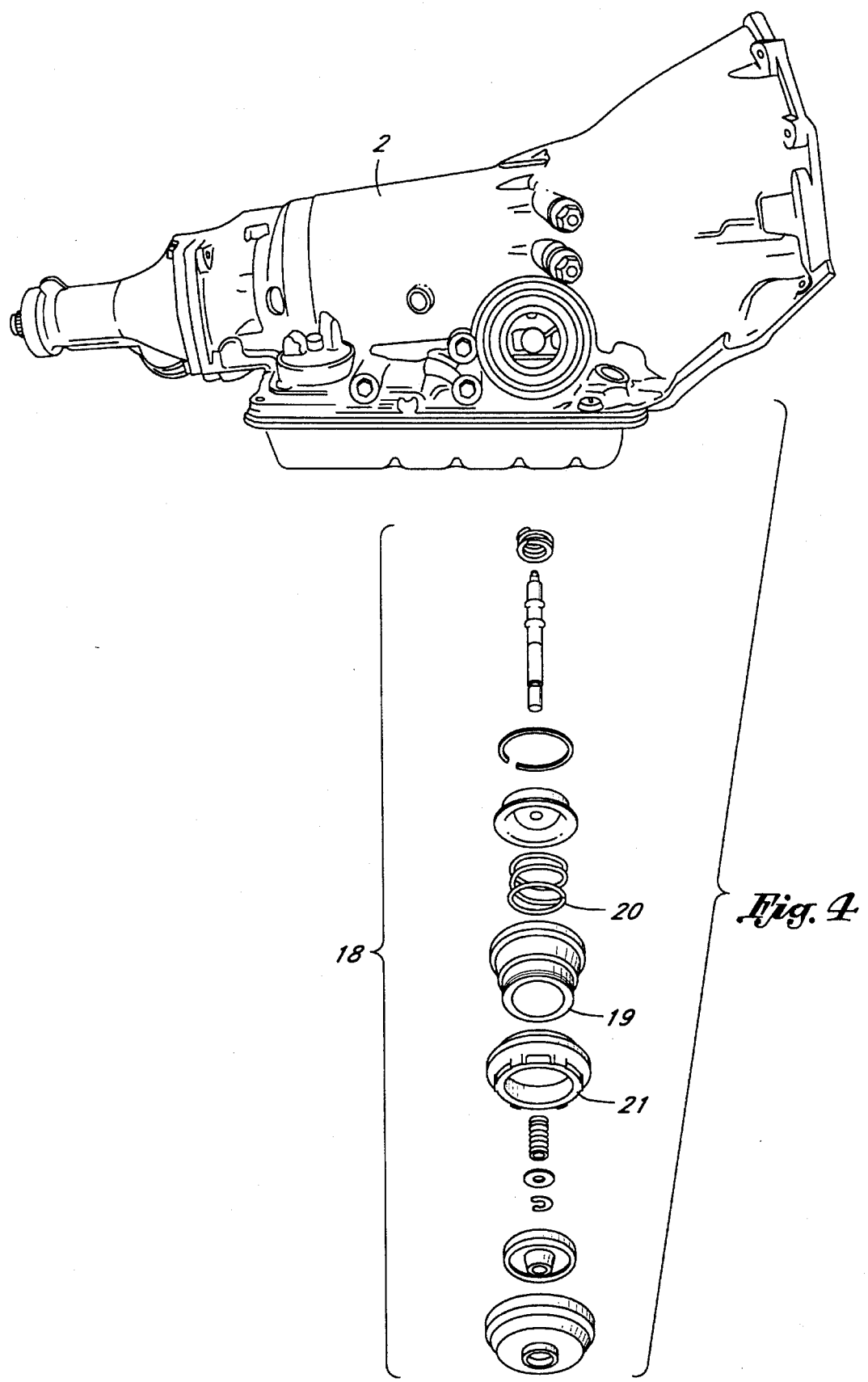
FIG. 4 shows an exploded view of the servo assembly.

FIG. 4 shows an exploded view of the servo assembly 18 in conjunction with the automatic transmission 2. For clarity, the servo assembly itself is shown as an exploded view. The modification consists of the removal of the servo cushion spring 20. For use in competition vehicles, piston 19 and piston holder 21 are removed and replaced with piston and piston holder normally found in the Corvette™ automatic transmission.

Figure 5:
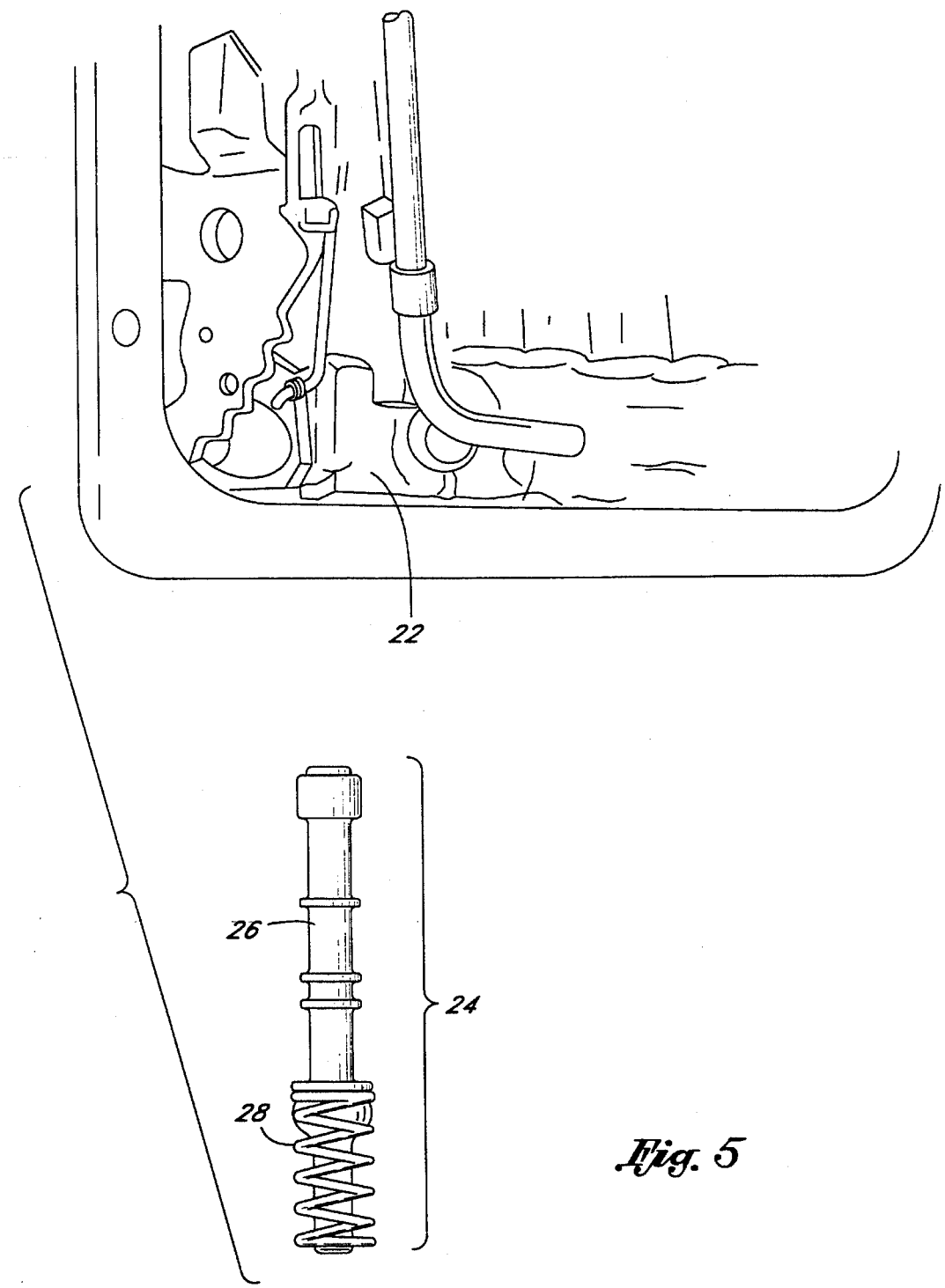
FIG. 5 shows the pressure regulator spring.

FIG. 5 shows an exploded view of the pressure regulator 24 in conjunction with the transmission pump. The modification consists of the removal and replacement of the regulator spring 28 with the spring provided in the transmission performance improvement kit.

FIG. 6 shows an exploded view of the throttle valve assembly 12 in conjunction with the valve body 16. The modification consists of the removal and replacement of the throttle valve spring 14 with the spring provided in the transmission performance improvement kit. Also shown is the third gear pressure switch 30, a part of the transmission performance improvement kit. This switch replaces the original fourth gear pressure switch.

Although the description above contains many specifications, these should not be construed as limiting the scope of the invention, but as merely providing illustrations of some of the presently preferred embodiments of the automatic transmission improvement kit.

I claim:

1. An automatic transmission comprising; a valve body, a plurality of band brakes and corresponding actuators, a plurality of disc clutches, shift change means encompassing an up-shift and a down-shift capability, a torque converter, a torque converter clutch, and a performance improvement kit consisting of an additional piston actuator, GM part number 8648998, located within the valve body in tandem with one of the said piston actuators, thereby increasing the holding power of said band brakes; a second substitute band apply piston, GM part number 8642079 and housing GM part number 8642110 for decreasing the apply time of another band brake; a valve body spring which delays the up-shift and increases the down-shift torque capacity of the shift change means; and a third gear pressure switch GM part number 8643710, which allows application of the torque converter clutch in fourth gear only.

2. An automatic transmission comprising; a valve body, a plurality of band brakes and corresponding piston actuators, a plurality of disk clutches, shift change means encompassing an up-shift and a down-shift capability, a torque converter, a torque converter clutch, and a performance improvement kit consisting of an additional piston actuator, GM part number 8648998, located within the valve body in tandem with one of the said piston actuators, thereby increasing the holding power of said band brakes: a valve body spring which delays the up-shift and increases the down-shift torque capacity of the shift change means; and a third gear pressure switch GM part number 8643710, which allows application of the torque converter clutch in fourth gear only.

* * * * *